US007527369B2

(12) United States Patent
Hirakawa

(10) Patent No.: US 7,527,369 B2

(45) Date of Patent: May 5, 2009

(54) IMAGE FORMING APPARATUS AND METHOD FOR IMPROVING THE FIXING CHARACTERISTICS OF INK

(75) Inventor: Takashi Hirakawa, Kanagawa (JP)

(73) Assignee: Fujifilm Corporation, Tokyo (JP)

(*) Notice: Subject to any disclaimer, the term of this patent is extended or adjusted under 35 U.S.C. 154(b) by 392 days.

(21) Appl. No.: 11/231,745

(22) Filed: Sep. 22, 2005

(65) Prior Publication Data

US 2006/0071990 A1 Apr. 6, 2006

(30) Foreign Application Priority Data

Sep. 24, 2004 (JP) ............................. 2004-278164

(51) Int. Cl.
*C09D 11/00* (2006.01)

(52) U.S. Cl. .................................... 347/100; 106/31.13

(58) Field of Classification Search ................. 347/100; 106/31.13

See application file for complete search history.

(56) References Cited

U.S. PATENT DOCUMENTS 6,153,001 A 11/2000 Suzuki et al.

2002/0140790 A1* 10/2002 Moriyama et al. ............ 347/96

2003/0064206 A1* 4/2003 Koyano et al. .............. 428/195

2003/0079643 A1* 5/2003 Tomioka et al. .......... 106/31.27

FOREIGN PATENT DOCUMENTS

JP 11-181340 A 7/1999

JP 2000-218772 A 8/2000

JP 2000218772 A * 8/2000

* cited by examiner

*Primary Examiner*—Manish S Shah
*Assistant Examiner*—Laura E Martin
(74) *Attorney, Agent, or Firm*—Birch, Stewart, Kolasch & Birch, LLP

(57) ABSTRACT

The image forming apparatus which has a first liquid application device which applies a first liquid to a recording medium and an ejection head which ejects a second liquid onto the first liquid having been applied to the recording medium by the first liquid application device, wherein a surface tension α1 of the first liquid is 35 mN/m or lower and a difference (α2−α1) between a surface tension α2 of the second liquid and the surface tension α1 of the first liquid is 10 mN/m or greater.

13 Claims, 10 Drawing Sheets

IMAGE FORMING APPARATUS AND METHOD FOR IMPROVING THE FIXING CHARACTERISTICS OF INK

BACKGROUND OF THE INVENTION

1. Field of the Invention

The present invention relates to an image forming apparatus and method, and more particularly, to an inkjet recording apparatus or other image forming apparatus, and an image forming method, whereby high-quality images are formed by improving the fixing characteristics of ink by combining two types of liquids on a recording medium.

2. Description of the Related Art

Japanese Patent Application Publication No. 2000-218772 discloses an inkjet recording apparatus which is capable of obtaining high-quality images by suppressing bleeding and feathering through the use of a treatment liquid which causes the coloring material in an ink to become insoluble or to aggregate. More specifically, Japanese Patent Application Publication No. 2000-218772 discloses technology which increases the permeability of the solvent, which is separate from the coloring material, when two liquids are combined, by reducing the surface tension of the treatment liquid, while also preventing bleeding of the ink by increasing the surface tension of the ink, and which also prevents feathering between colors by raising the fixing properties of the mixture generated by the two liquids. Under proposed specific conditions, the surface tension of the treatment liquid including cationic material is 25 to 30 dyne/cm and the surface tension of the ink containing a dye having anionic material is 33 to 45 dyne/cm.

Japanese Patent Application Publication No. 2000-218772 provides technology aimed at preventing bleeding and feathering between colors; however, it does not contemplate the deformation of the dots formed by liquid droplets on the surface of the recording medium, or the occurrence of non-uniformities in recording density caused by mutually adjacent dots (in other words, droplet deposition interference). When printing at high speed, the droplet deposition interval between adjacent dots is extremely short, and a successive ink droplet (ink for forming a dot adjacent to an existing dot) is deposited before an ink droplet deposited previously on the recording medium has completed fixing. In this case, the mutually adjacent dots in droplet form interfere with each other on the recording medium, and furthermore, they may aggregate and unify.

SUMMARY OF THE INVENTION

The present invention has been contrived in view of the foregoing circumstances, an object thereof being to provide an image forming apparatus and an image forming method whereby droplet deposition interference between mutually adjacent dots can be prevented and high-quality images can be formed at high speed.

In order to attain the aforementioned object, the present invention is directed to an image forming apparatus, comprising: a first liquid application device which applies a first liquid to a recording medium; and an ejection head which ejects a second liquid onto the first liquid having been applied to the recording medium by the first liquid application device, wherein: a surface tension $\alpha \mathbf{1}$ of the first liquid is 35 mN/m or lower; and a difference ($\alpha \mathbf{2}-\alpha \mathbf{1}$) between a surface tension $\alpha \mathbf{2}$ of the second liquid and the surface tension $\alpha \mathbf{1}$ of the first liquid is 10 mN/m or greater.

According to the present invention, the first liquid is applied to the recording medium by the first liquid application device, and the second liquid is ejected from the ejection head and deposited onto the first liquid, while the first liquid is still present on the recording medium. In this case, deposition interference between mutually adjacent dots is prevented by hardening of the second liquid due to reaction between the second liquid and the first liquid. By setting the surface tension $\alpha \mathbf{1}$ of the first liquid to 35 mN/m or less, it is possible to apply the first liquid relatively thinly onto the recording medium, without causing non-uniformities. Furthermore, if the difference ($\alpha \mathbf{2}-\alpha \mathbf{1}$) between the surface tensions of the second liquid and first liquid is set to 10 mN/m or greater, then the first liquid is readily able to cover the perimeter of the second liquid deposited onto the first liquid, and hence the effect of preventing deposition interference is increased.

Desirably, of the first liquid and the second liquid, the application of at least the second liquid onto the recording medium (in other words, the ejection from the ejection head) is controlled on the basis of the image data for printing. For the first liquid application device, it is possible to use a device which ejects the first liquid in the state of droplets, by using an inkjet type ejection head, a device which applies the first liquid using an application member, such as a roller, brush, a blade-type member, a porous member, or the like, a device which applies the first liquid by spraying the first liquid in the form of a mist, or a suitable combination of these devices.

In a composition where the first liquid is applied using an ejection head, it is possible to apply the first liquid selectively by restricting same to the printing locations on the recording medium, on the basis of the image data, and hence the amount of first liquid consumed can be reduced in comparison with an application device using a roller, or the like.

On the other hand, a device which applies the first liquid by causing an application member, such as a roller, to make contact with the recording medium has a merit in that it can be used with a liquid having a high viscosity of a level which is difficult to eject from an inkjet type ejection head.

Preferably, an angle of contact of the second liquid on the first liquid is 35 degrees or less.

It is desirable to select a combination of the first and second liquids whereby the angle of contact of the second liquid with respect to the first liquid is 35 degrees or less when the second liquid makes contact with the first liquid, since this increases the fixing force of the second liquid on the recording medium (first liquid) (in other words, it reduces the liability of the second liquid to move on the recording medium), and hence makes the second liquid more liable to remain at its landing position.

Preferably, the image forming apparatus further comprises: a medium information acquiring device which acquires information relating to permeation speed characteristics of the recording medium; and a first liquid application control device which controls a process of applying the first liquid by the first liquid application device, according to the information obtained by the medium information acquiring device.

In order to obtain the desired beneficial effects by reacting the first liquid with the second liquid on the recording medium, it is necessary for at least a prescribed quantity of the first liquid to be present on the recording medium when the second liquid is deposited. For example, if a recording medium having high permeability is used, then it may not be possible to ensure the presence of the prescribed amount of the first liquid in the vicinity of the surface of the recording medium, due to the first liquid permeating into the recording medium after application of the first liquid and before deposition of the second liquid. Furthermore, if droplets of the second liquid are deposited in a state where the first liquid has permeated into the recording medium, then it may happen that the second liquid spreads within the range in which the first liquid has permeated, thereby further exacerbating the degree of bleeding in comparison with a case where droplets of the second liquid are deposited without using the first liquid.

Therefore, it is desirable to control the process of applying the first liquid in accordance with the permeation speed characteristics of the first liquid into the recording medium. As a method for controlling the process of applying the first liquid, it is possible to select the type of the first liquid, to adjust the volume of liquid, or to switch between using and not using the first liquid, and the like.

Preferably, a plurality of types of liquid are prepared as the first liquid; and the first liquid application control device performs control to select one of the plurality of types of liquid to be applied to the recording medium, according to the information obtained by the medium information acquiring device.

For example, a desirable mode is one in which a treatment liquid having high surface tension is selected, the greater the permeation speed of the recording medium. Accordingly, it is possible to improve the bleeding prevention effect yet further.

Preferably, the first liquid application control device performs control to switch between implementation and non-implementation of the process of applying the first liquid onto the recording medium, according to the information obtained by the medium information acquiring device.

Instead of or in combination with the mode where the type of the first liquid is changed in accordance with the permeation speed characteristics of the recording medium, it is also possible to adopt a mode where the use or non-use of the first liquid is controlled.

For example, there is a control mode in which the first liquid is not used when employing a recording medium of which permeation speed as measured under certain prescribed measurement conditions (liquid type, liquid volume, temperature, and the like) is faster than a prescribed judgment reference value.

The recording medium information acquiring device may comprise, for example, a device which measures the optical reflectivity of the recording medium, or a device which reads in the type of the recording medium used from the ID, or the like, of the supply magazine. Furthermore, the medium information acquiring device is not limited to a device which obtains information automatically by means of sensors, an information reading device, or the like, and it may also constituted in such a manner that information relating to the type of recording medium or the like is input by a user by means of a prescribed input device or the like.

Preferably, the second liquid is an ink containing a coloring material; and the first liquid is a treatment liquid having a reactivity which causes at least a surface portion of a deposited droplet of the second liquid to harden.

When the second liquid makes contact with the first liquid, the first liquid moves onto the surface of the droplet of the second liquid, due to the difference between the surface tension of the two liquids, and hence it covers the circumference of the second liquid droplet. In this way, at least the surface (boundary) portion of the second liquid making contact with the first liquid hardens due to reaction between the two liquids. Here, "hardening" means hardening to a level which prevents mixing of liquid droplets deposited at mutually adjacent positions due to aggregation (including a semi-hardened or semi-solidified state).

Due to the aforementioned hardening reaction, the plurality of liquid droplets (droplets of the second liquid) deposited on the first liquid by ejecting droplets consecutively from the ejection head remain as mutually isolated droplets, without the mutually adjacent droplets combining (unifying due to coalescence). In this way, deposition interference is prevented and the droplets can be made to form independent dots when fixing after deposition, thus making it possible to form high-quality images.

A compositional example of an ejection head in the image forming apparatus according to the present invention is a full line type inkjet head having a nozzle row in which a plurality of nozzles are arranged through a length corresponding to the full width of the recording medium.

In this case, a mode may be adopted in which a plurality of relatively short ejection head blocks having nozzles rows which do not reach a length corresponding to the full width of the recording medium are combined and joined together, thereby forming nozzle rows of a length that correspond to the full width of the recording medium.

A full line type inkjet head is usually disposed in a direction perpendicular to the relative feed direction (relative conveyance direction) of the recording medium, but modes may also be adopted in which the inkjet head is disposed following an oblique direction that forms a prescribed angle with respect to the direction perpendicular to the relative conveyance direction.

The "recording medium" in the image forming apparatus indicates a medium on which an image is recorded by means of liquid ejected from the ejection head (this medium may also be called a recording medium, print medium, image forming medium, ejection receiving medium, image receiving medium, or the like). This term includes various types of media, irrespective of material and size, such as continuous paper, cut paper, sealed paper, resin sheets, such as OHP sheets, film, cloth, a printed circuit board on which a wiring pattern, or the like, is formed by means of a liquid droplet ejection head, and an intermediate transfer medium, and the like.

The conveyance device for causing the recording medium and the ejection head to move relative to each other may include a mode where the recording medium is conveyed with respect to a stationary (fixed) head, or a mode where a head is moved with respect to a stationary recording medium, or a mode where both the head and the recording medium are moved.

In order to attain the aforementioned object, the present invention is also directed to an image forming method, comprising: a first liquid application step of applying a first liquid to a recording medium; and a second liquid ejection step of ejecting a second liquid from an ejection head, according to image data for printing, onto the first liquid having been applied to the recording medium in the first liquid application step, wherein: a surface tension $\alpha\mathbf{1}$ of the first liquid is 35 mN/m or lower; and a difference ($\alpha\mathbf{2}-\alpha\mathbf{1}$) between a surface tension $\alpha\mathbf{2}$ of the second liquid and the surface tension $\alpha\mathbf{1}$ of the first liquid is 10 mN/m or greater.

According to the present invention, by selecting, as the physical conditions of a first liquid and second liquid used when forming an image by applying a first liquid to a recording medium and then ejecting a second liquid onto the first liquid, two types of liquids whereby the surface tension $\alpha\mathbf{1}$ of the first liquid is 35 mN/m or less and the difference between the surface tension $\alpha\mathbf{2}$ of the second liquid and the surface tension $\alpha\mathbf{1}$ of the first liquid (namely, $\alpha\mathbf{2}-\alpha\mathbf{1}$) is 10 mN/m or greater, it is possible to prevent deposition interference between mutually adjacent dots and a satisfactory group of dots can be formed by independent dots. Consequently, it is possible to form an image of high quality at high speed.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

General Composition of Inkjet Recording Apparatus

Figure 1:
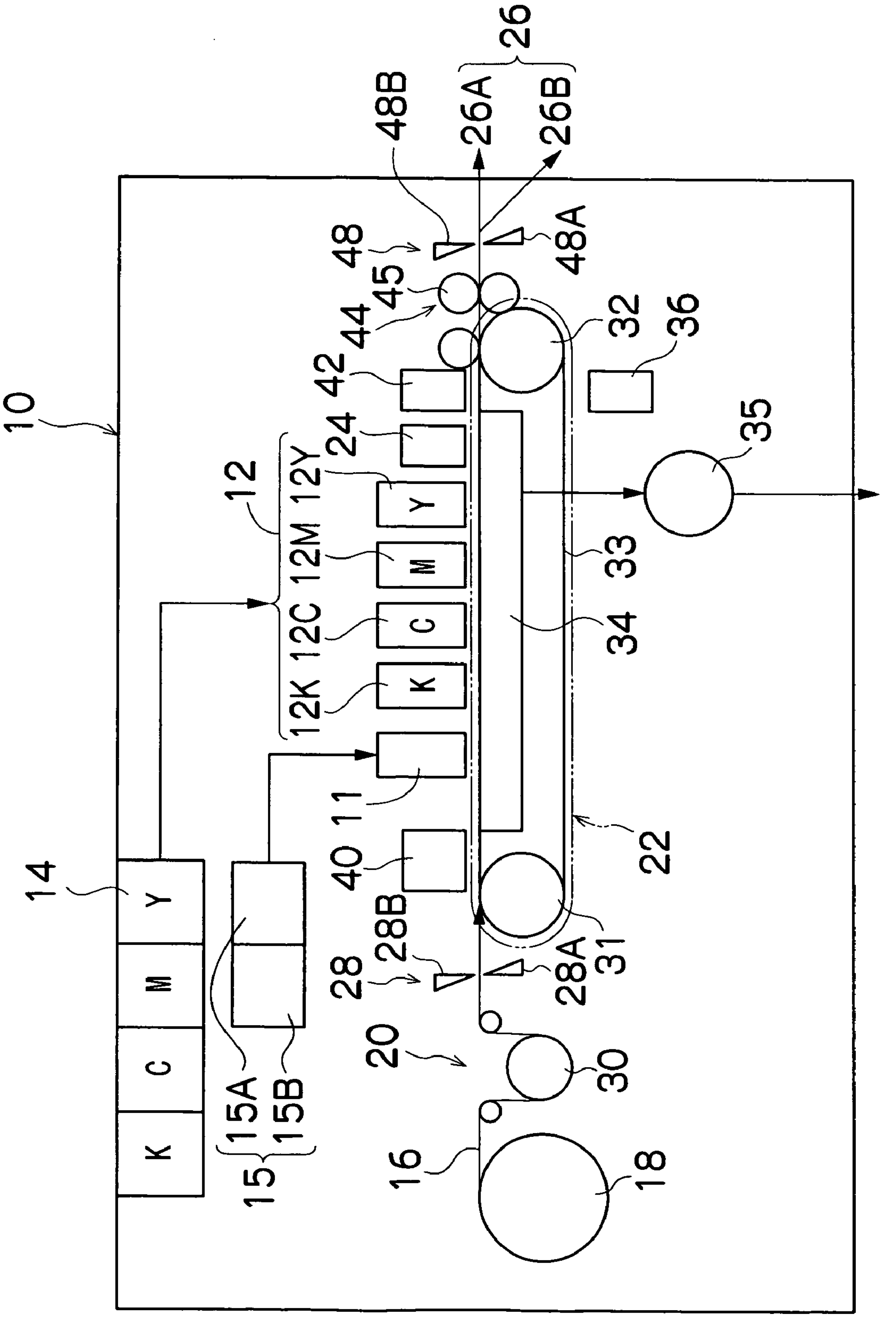
FIG. 1 is a general schematic drawing of an inkjet recording apparatus according to an embodiment of the present invention.

FIG. 1 is a diagram of the general composition of an inkjet recording apparatus relating to an embodiment of the present invention. As shown in FIG. 1, the inkjet recording apparatus 10 comprises: a treatment liquid ejection head 11 (corresponding to a first treatment liquid application device) for ejecting a treatment liquid corresponding to a first liquid; a printing unit 12 having a plurality of inkjet heads (hereafter, called "heads") 12K, 12C, 12M, and 12Y provided for colors of ink (corresponding to a second liquid) of black (K), cyan (C), magenta (M), and yellow (Y), respectively; an ink storing and loading unit 14 for storing inks of K, C, M and Y to be supplied to the print heads 12K, 12C, 12M, and 12Y; a treatment liquid storing and loading unit 15 for storing the treatment liquid to be supplied to the treatment liquid ejection head 11; a media supply unit 18 for supplying a recording medium 16; a decurling unit 20 for removing curl in the recording medium 16; a suction belt conveyance unit 22 disposed facing the nozzle face (ink-droplet ejection face) of the print unit 12, for conveying the recording medium 16 while keeping the recording medium 16 flat; a print determination unit 24 for reading the printed result produced by the printing unit 12; and an output unit 26 for outputting recorded recording medium (printed matter) to the exterior.

The ink storing and loading unit 14 has ink tanks for storing the inks of K, C, M and Y to be supplied to the heads 12K, 12C, 12M, and 12Y, and the tanks are connected to the heads 12K, 12C, 12M, and 12Y by means of prescribed channels. The ink storing and loading unit 14 has a warning device (for example, a display device or an alarm sound generator) for warning when the remaining amount of any ink is low, and has a mechanism for preventing loading errors among the colors.

The treatment liquid storing and loading unit 15 has treatment liquid tanks 15A and 15B which store a plurality of types of treatment liquids and these treatment liquid tanks 15A and 15B are connected to the treatment liquid ejection head 11 by means of prescribed piping. For the sake of convenience, here, the treatment liquid supplied from the treatment liquid tank 15A is called "treatment liquid A", and the treatment liquid supplied from the treatment liquid tank 15B is called "treatment liquid B".

In FIG. 1, two treatment liquid tanks 15A and 15B are depicted, and a composition is shown in which two types of treatment liquids A and B are supplied to a common treatment liquid ejection head 11, and the treatment liquid A or the treatment liquid B is ejected from the treatment liquid ejection head 11 by selectively switching the liquid type; however, the number of types of treatment liquid is not limited in particular, and any number of types of treatment liquid may be used. Furthermore, it is also possible to adopt a composition in which a plurality of independent treatment liquid ejection heads are provided for liquid types, in accordance with the number of types of treatment liquid.

Similarly to the ink storing and loading unit 14, the treatment liquid storing and loading unit 15, also comprises a warning device (for example, a display device or an alarm sound generator) for warning when the remaining amount of any treatment liquid is low, and has a mechanism for preventing loading errors among the treatment liquids.

The ink used in the present embodiment is, for instance, colored ink including anionic polymer, namely, a polymer containing negatively charged surface-active ions. Furthermore, the treatment liquid used in the present embodiment is, for instance, a transparent reaction promotion agent including cationic polymer, namely, a polymer containing positively charged surface-active ions.

When the ink and the treatment liquid are mixed, the insolubility and/or fixing reaction of the coloring material in the ink proceeds due to a chemical reaction. Here the term "insolubility" includes a phenomenon whereby the coloring material separates or precipitates from the solvent, a phenomenon whereby the liquid in which the coloring material is dissolved changes (coagulates) to a solid phase, or a phenomenon whereby the liquid increases in viscosity and hardens. Furthermore, the term "fixing" may indicate a mode where the coloring material is held on the surface of the recording medium 16, a mode where the coloring material permeates into the recording medium 16 and is held therein, or a mode combining these states.

The reaction speed and the characteristics (surface tension, viscosity, and the like) of the respective liquids can be adjusted by regulating the respective compositions of the ink and treatment liquids, the concentration of the materials contributing to the reaction, or the like, and thus desired ink insolubility and/or ink fixing properties (hardening speed, fixing speed, or the like) can be achieved. The physical conditions of the treatment liquids and the ink used in the present embodiment are described hereinafter.

As regards the supply system for the recording medium 16, in FIG. 1, a magazine for rolled paper (continuous paper) is shown as an example of the media supply unit 18; however, a plurality of magazines with papers of different paper width and quality may be jointly provided. Moreover, papers may be supplied in cassettes that contain cut papers loaded in layers and that are used jointly or in lieu of magazines for rolled papers.

In the case of a configuration in which a plurality of types of recording medium can be used, it is preferable that an information recording medium such as a bar code and a wireless tag containing information about the type of recording medium is attached to the magazine, and by reading the information contained in the information recording medium with a predetermined reading device, the type of recording medium (media type) to be used is automatically determined, and ejection is controlled so that the treatment liquids and ink droplets are ejected in an appropriate manner in accordance with the type of medium.

The recording medium 16 delivered from the media supply unit 18 retains curl due to having been loaded in the magazine. In order to remove the curl, heat is applied to the recording medium 16 in the decurling unit 20 by a heating drum 30 in the direction opposite from the curl direction in the magazine. The heating temperature at this time is preferably controlled so that the recording medium 16 has a curl in which the surface on which the print is to be made is slightly round outward.

In the case of the configuration in which roll paper is used, a cutter (first cutter) 28 is provided as shown in FIG. 1, and the continuous paper is cut into a desired size by the cutter 28. The cutter 28 has a stationary blade 28A, of which length is not less than the width of the conveyor pathway of the recording medium 16, and a round blade 28B, which moves along the stationary blade 28A. The stationary blade 28A is disposed on the reverse side of the printed surface of the recording medium 16, and the round blade 28B is disposed on the printed surface side across the conveyor pathway. When cut papers are used, the cutter 28 is not required.

The decurled and cut recording medium 16 is delivered to the suction belt conveyance unit 22. The suction belt conveyance unit 22 has a configuration in which an endless belt 33 is set around rollers 31 and 32 so that the portion of the endless belt 33 facing at least the nozzle face of the printing unit 12 and the sensor face of the print determination unit 24 forms a horizontal plane (flat plane).

The belt 33 has a width that is greater than the width of the recording medium 16, and a plurality of suction apertures (not shown) are formed on the belt surface. A suction chamber 34 is disposed in a position facing the sensor surface of the print determination unit 24 and the nozzle surface of the printing unit 12 on the interior side of the belt 33, which is set around the rollers 31 and 32, as shown in FIG. 1. The suction chamber 34 provides suction with a fan 35 to generate a negative pressure, and the recording medium 16 is held on the belt 33 by suction.

The belt 33 is driven in the clockwise direction in FIG. 1 by the motive force of a motor 88 (not shown in FIG. 1, but shown in FIG. 7) being transmitted to at least one of the rollers 31 and 32, which the belt 33 is set around, and the recording medium 16 held on the belt 33 is conveyed from left to right in FIG. 1.

Since ink adheres to the belt 33 when a marginless print job or the like is performed, a belt-cleaning unit 36 is disposed in a predetermined position (a suitable position outside the printing area) on the exterior side of the belt 33. Although the details of the configuration of the belt-cleaning unit 36 are not shown, examples thereof include a configuration in which the belt 33 is nipped with cleaning rollers such as a brush roller and a water absorbent roller, an air blow configuration in which clean air is blown onto the belt 33, or a combination of these. In the case of the configuration in which the belt 33 is nipped with the cleaning rollers, it is preferable to make the line velocity of the cleaning rollers different than that of the belt 33 to improve the cleaning effect.

The inkjet recording apparatus 10 can comprise a roller nip conveyance mechanism, in which the recording medium 16 is pinched and conveyed with nip rollers, instead of the suction belt conveyance unit 22. However, there is a drawback in the roller nip conveyance mechanism that the print tends to be smeared when the printing area is conveyed by the roller nip action because the nip roller makes contact with the printed surface of the paper immediately after printing. Therefore, the suction belt conveyance in which nothing comes into contact with the image surface in the printing area is preferable.

A heating fan 40 is disposed on the upstream side of the printing unit 12 in the media conveyance pathway formed by the suction belt conveyance unit 22. The heating fan 40 blows heated air onto the recording medium 16 to heat the recording medium 16 immediately before printing so that the ink deposited on the recording medium 16 dries more easily.

The treatment liquid ejection head 11 and the print heads 12K, 12M, 12C and 12Y of the print unit 12 are full line heads having a length corresponding to the maximum width of the recording medium 16 used with the inkjet recording apparatus 10 (see FIG. 2), and comprising nozzles for ejecting ink or nozzles for ejecting treatment liquid arranged on a nozzle face through a length exceeding at least one edge of the maximum-size recording paper (namely, the full width of the printable range).

The heads 12K, 12C, 12M and 12Y of the print unit 12 are arranged in the sequence of the colors, black (K), cyan (C), magenta (M) and yellow (Y), from the upstream side, in the direction of conveyance of the recording medium 16, and the treatment liquid ejection head 11 is disposed further to the upstream side of the print unit 12. The heads 11, 12K, 12C, 12M and 12Y are disposed in fixed positions in such a manner that they extend in a direction substantially perpendicular to the conveyance direction of the recording medium 16. By means of this head arrangement, it is possible to apply a treatment liquid to the print surface (recording surface) of the recording medium 16 by means of the treatment liquid ejection head 11, before depositing colored inks from the print unit 12.

A color image can be formed on the recording medium 16 by ejecting inks of different colors from the heads 12K, 12C, 12M and 12Y, respectively, onto the recording medium 16 while the recording medium 16 is conveyed by the suction belt conveyance unit 22.

By adopting a configuration in which the full line heads 12K, 12C, 12M and 12Y having nozzle rows covering the full paper width are provided for the respective colors in this way, it is possible to record an image on the full surface of the recording medium 16 by performing just one operation of relatively moving the recording medium 16 and the printing unit 12 in the paper conveyance direction (the sub-scanning direction), in other words, by means of a single sub-scanning action. Higher-speed printing is thereby made possible and productivity can be improved in comparison with a shuttle type head configuration in which a recording head reciprocates in the main scanning direction.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 24 shown in FIG. 1 has an image sensor for capturing an image of the ink-droplet deposition result of the printing unit 12, and functions as a device to check for ejection defects such as clogs of the nozzles in the printing unit 12 from the ink-droplet deposition results evaluated by the image sensor.

The print determination unit 24 of the present embodiment is configured with at least a line sensor having rows of photoelectric transducing elements with a width that is greater than the ink-droplet ejection width (image recording width) of the heads 12K, 12C, 12M, and 12Y. This line sensor has a color separation line CCD sensor including a red (R) sensor row composed of photoelectric transducing elements (pixels) arranged in a line provided with an R filter, a green (G) sensor row with a G filter, and a blue (B) sensor row with a B filter. Instead of a line sensor, it is possible to use an area sensor composed of photoelectric transducing elements which are arranged two-dimensionally.

A test pattern or the target image printed by the print heads 12K, 12C, 12M, and 12Y of the respective colors is read in by the print determination unit 24, and the ejection performed by each head is determined. The ejection determination includes detection of the ejection, measurement of the dot size, and measurement of the dot formation position.

A post-drying unit 42 is disposed following the print determination unit 24. The post-drying unit 42 is a device to dry the printed image surface, and includes a heating fan, for example. It is preferable to avoid contact with the printed surface until the printed ink dries, and a device that blows heated air onto the printed surface is preferable.

In cases in which printing is performed with dye-based ink on porous paper, blocking the pores of the paper by the application of pressure prevents the ink from coming contact with ozone and other substance that cause dye molecules to break down, and has the effect of increasing the durability of the print.

A heating/pressurizing unit 44 is disposed following the post-drying unit 42. The heating/pressurizing unit 44 is a device to control the glossiness of the image surface, and the image surface is pressed with a pressure roller 45 having a predetermined uneven surface shape while the image surface is heated, and the uneven shape is transferred to the image surface.

The printed matter generated in this manner is outputted from the paper output unit 26. The target print (i.e., the result of printing the target image) and the test print are preferably outputted separately. In the inkjet recording apparatus 10, a sorting device (not shown) is provided for switching the outputting pathways in order to sort the printed matter with the target print and the printed matter with the test print, and to send them to paper output units 26A and 26B, respectively.

When the target print and the test print are simultaneously formed in parallel on the same large sheet of paper, the test print portion is cut and separated by a cutter (second cutter) 48. The cutter 48 is disposed directly in front of the paper output unit 26, and is used for cutting the test print portion from the target print portion when a test print has been performed in the blank portion of the target print. The structure of the cutter 48 is the same as the first cutter 28 described above, and has a stationary blade 48A and a round blade 48B.

Although not shown in FIG. 1, the paper output unit 26A for the target prints is provided with a sorter for collecting prints according to print orders.

Structure of Head

Next, the structure of a head will be described. The heads 12K, 12C, 12M and 12Y of the respective ink colors have the same structure, and a reference numeral 50 is hereinafter designated to any of the heads.

Figure 2:
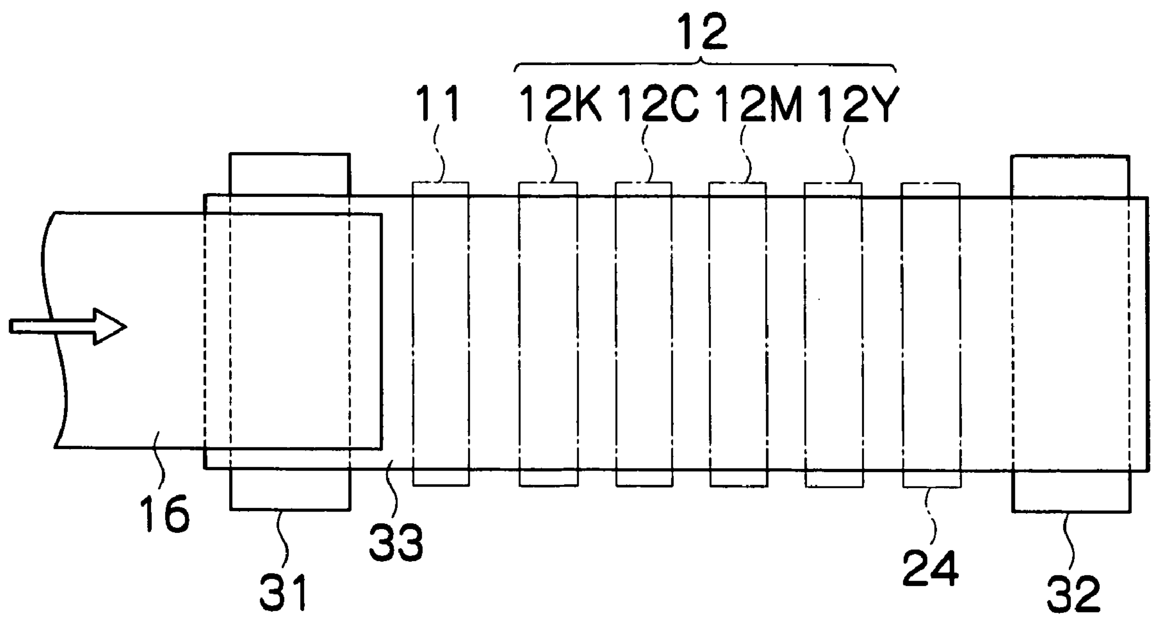
FIG. 2 is a plan view of the principal part of the peripheral area of a print unit in the inkjet recording apparatus shown in FIG. 1.
Figure 3A:
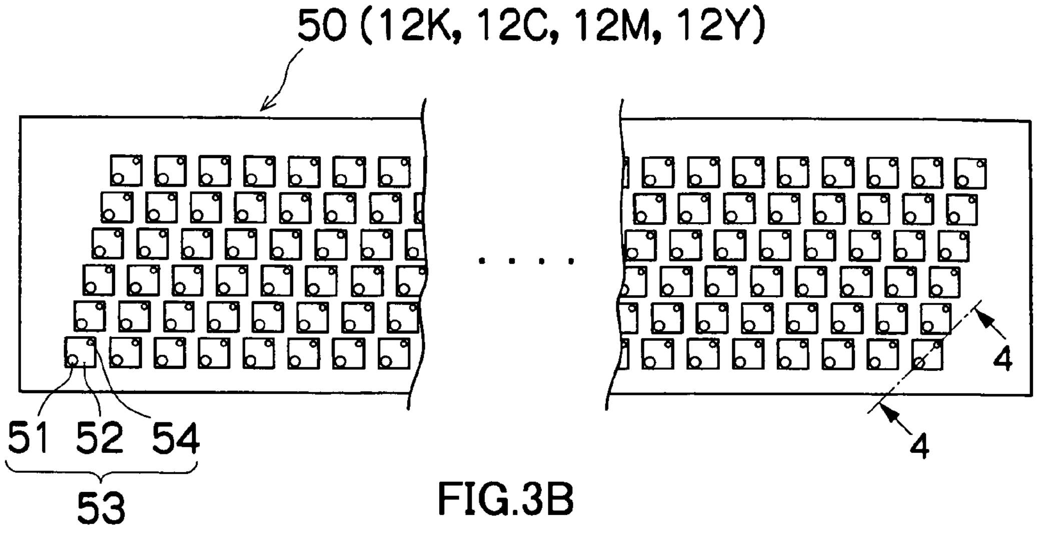
FIG. 3A is a plan view perspective diagram showing an example of the composition of a print head.
Figure 3B:
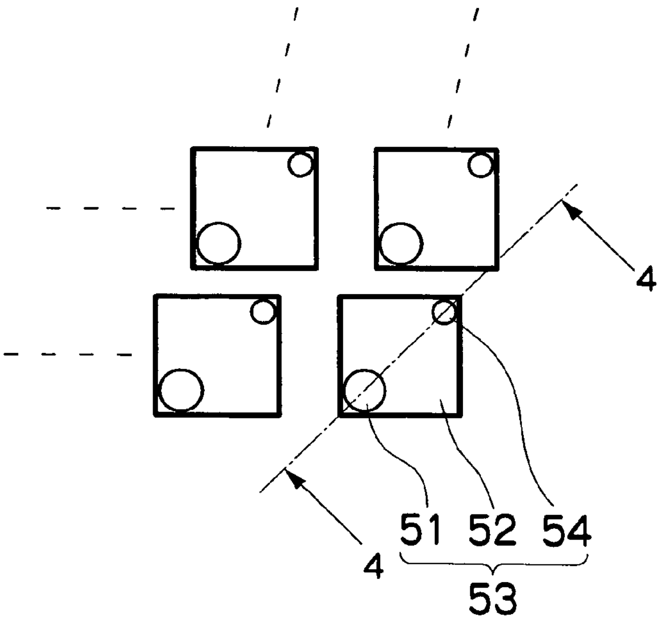
FIG. 3B is a principal enlarged view of FIG. 3A.
Figure 3C:
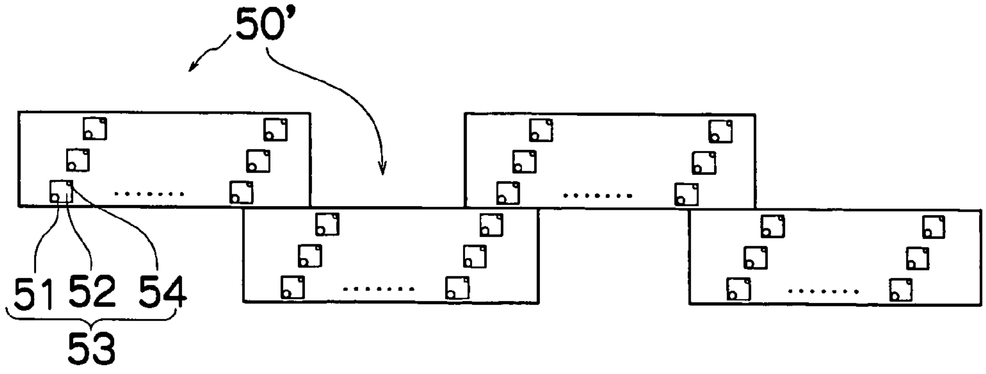
FIG. 3C is a plan view perspective diagram showing a further example of the composition of a full line head.
Figure 4:
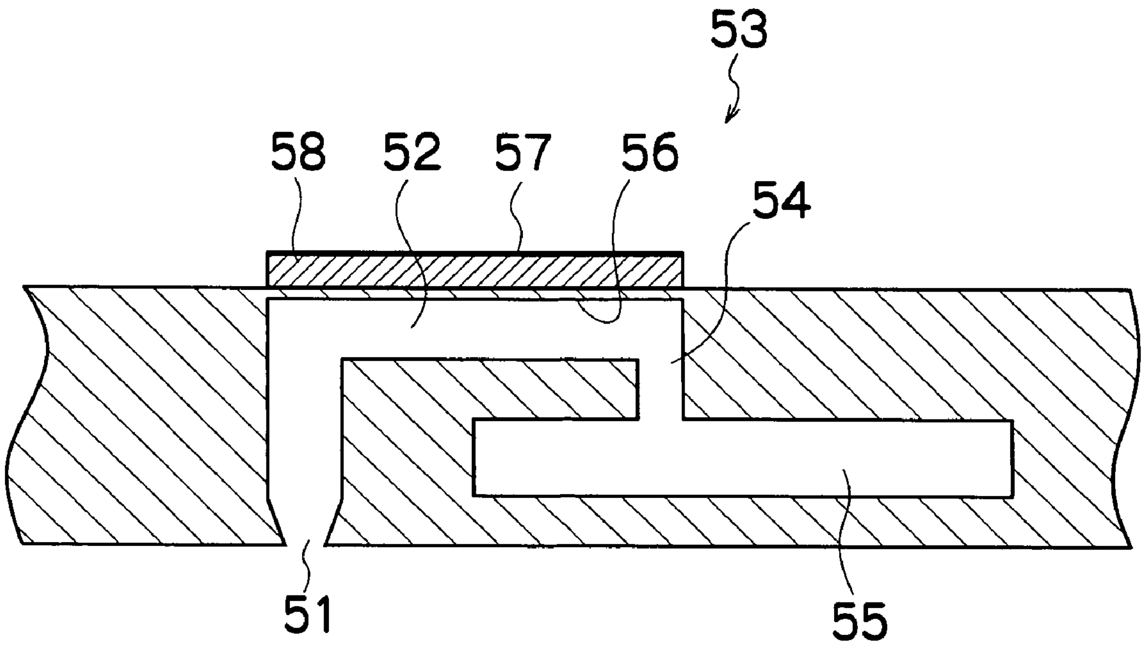
FIG. 4 is a cross-sectional view along line 4-4 in FIG. 3A.

FIG. 3A is a perspective plan view showing an example of the configuration of the head 50, FIG. 3B is an enlarged view of a portion thereof, FIG. 3C is a perspective plan view showing another example of the configuration of the head 50, and FIG. 4 is a cross-sectional view taken along the line 4-4 in FIG. 2, showing the inner structure of a droplet ejection element (an ink chamber unit for one nozzle 51).

The nozzle pitch in the head 50 should be minimized in order to maximize the density of the dots printed on the surface of the recording medium 16. As shown in FIGS. 3A and 3B, the head 50 according to the present embodiment has a structure in which an ink chamber unit (droplet ejection elements) 53, each comprising a nozzle 51 forming an ink droplet ejection port, a pressure chamber 52 corresponding to the nozzle 51, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced and high nozzle density is achieved.

The mode of forming one or more nozzle rows having a length corresponding to the entire width of the recording medium 16 in a direction substantially orthogonal to the conveyance direction of the recording medium 16 is not limited to the example described here. For example, instead of the composition in FIG. 3A, as shown in FIG. 3C, a line head having nozzle rows of a length corresponding to the entire length of the recording medium 16 can be formed by arranging and combining, in a staggered matrix, short head units 50' each having a plurality of nozzles 51 arrayed in a two-dimensional fashion.

As shown in FIGS. 3A and 3B, the planar shape of the pressure chamber 52 provided for each nozzle 51 of the head 50 is substantially a square, and an outlet to the nozzle 51 and an inlet of supplied ink (supply port) 54 are disposed in both corners on a diagonal line of the square.

As shown in FIG. 4, each pressure chamber 52 is connected to a common channel 55 through the supply port 54. The common channel 55 is connected to an ink tank 60 (not shown in FIG. 4, but shown in FIG. 6), which is a base tank that supplies ink, and the ink supplied from the ink tank 60 is delivered through the common flow channel 55 in FIG. 4 to the pressure chambers 52.

An actuator 58 provided with an individual electrode 57 is bonded to a pressure plate 56 (a diaphragm that also serves as a common electrode) which forms the ceiling of the pressure chamber 52. When a drive voltage is applied to the individual electrode 57, then the actuator 58 deforms, thereby changing the volume of the pressure chamber 52. This causes a pressure change which results in ink being ejected from the nozzle 51. When ink is ejected, new ink is supplied to the pressure chamber 52 from the common flow channel 55 through the supply port 54. A piezoelectric element is suitable as the actuator 58.

Figure 5:
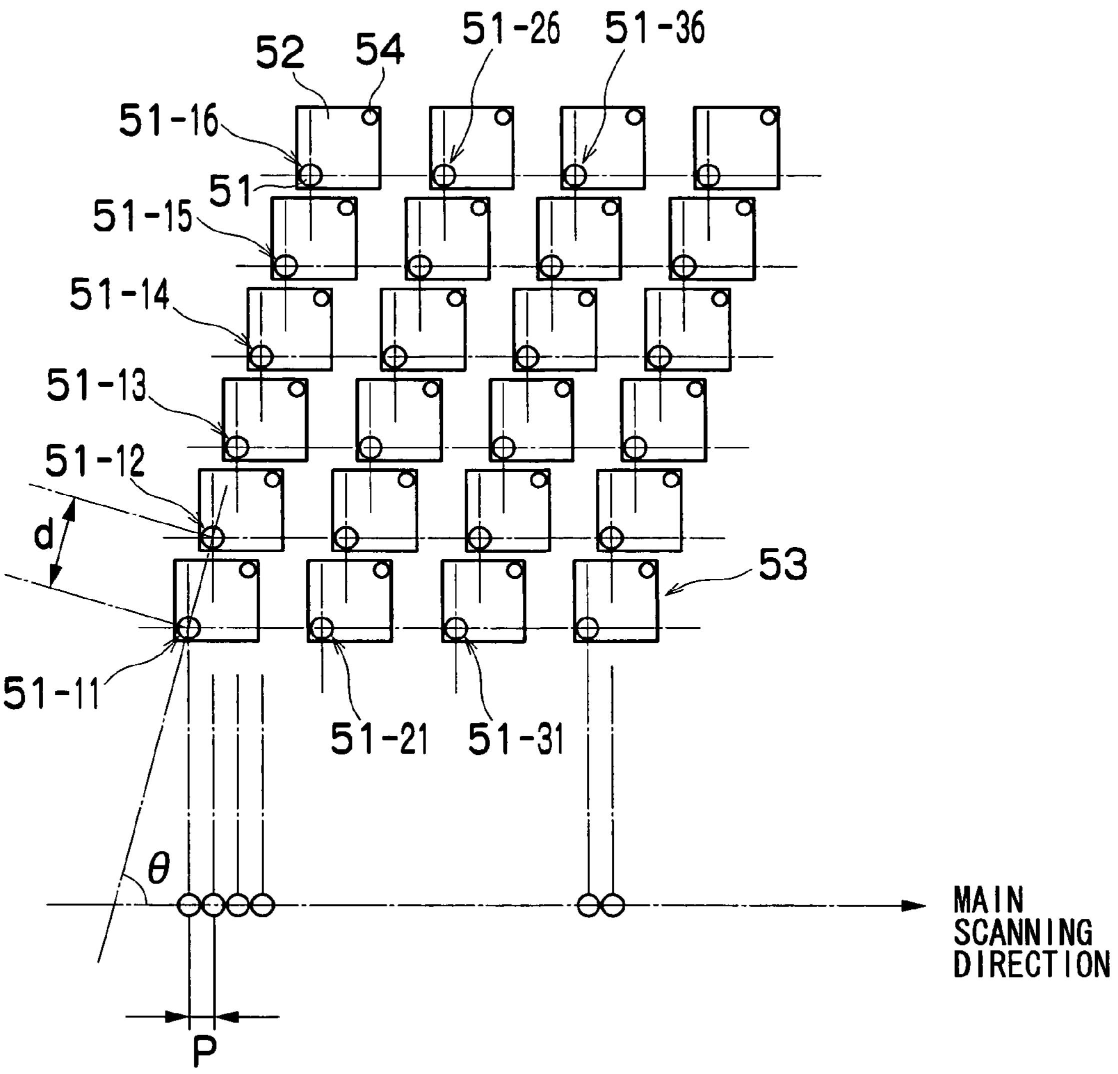
FIG. 5 is an enlarged view showing a nozzle arrangement in the print head shown in FIG. 3A.

As shown in FIG. 5, the high-density nozzle head according to the present embodiment is achieved by arranging a plurality of ink chamber units 53 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 53 are arranged at a uniform pitch d in line with a direction forming an angle of θ with respect to the main scanning direction, the pitch P of the nozzles projected to an alignment in the main scanning direction is d×cos θ, and hence it is possible to treat the nozzles 51 as they are arranged linearly at a uniform pitch of P. By adopting a composition of this kind, it is possible to achieve nozzle rows of high density.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording medium (the direction perpendicular to the conveyance direction of the recording medium) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 51 arranged in a matrix such as that shown in FIG. 5 are driven, the main scanning according to the above-described (3) is preferred. More specifically, the nozzles 51-11, 51-12, 51-13, 51-14, 51-15 and 51-16 are treated as a block (additionally; the nozzles 51-21, 51-22, . . . , 51-26 are treated as another block; the nozzles 51-31, 51-32, . . . , 51-36 are treated as another block; . . . ); and one line is printed in the width direction of the recording medium by sequentially driving the nozzles 51-11, 51-12, . . . , 51-16 in accordance with the conveyance velocity of the recording medium 16.

On the other hand, "sub-scanning" is defined as to repeatedly perform printing of one line (a line formed of a row of dots, or a line formed of a plurality of rows of dots) formed by the main scanning, while moving the full-line head and the recording medium 16 relatively to each other.

In implementing the present invention, the arrangement of the nozzles is not limited to that of the example illustrated. Moreover, a method is employed in the present embodiment where an ink droplet is ejected by means of the deformation of the actuator 58, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Although not shown here, the structure of the treatment liquid ejection head 11 is approximately the same as the head 50 of the print unit 12 described above. The treatment liquid ejection head 11 according to the present embodiment is a head capable of selectively ejecting two types of treatment liquids, and it has a plurality of nozzle rows corresponding to types of treatment liquids (here, taken to be a nozzle row for ejecting treatment liquid A and a nozzle row for ejecting treatment liquid B). Naturally, a flow channel for treatment liquid A and a flow channel for treatment liquid B are formed respectively inside the treatment liquid ejection head 11 (separate flow channel structures being adopted in such a manner that the different types of treatment liquids do not mix together).

Since the treatment liquid should be applied to the recording medium 16 in a substantially uniform (even) fashion in the region where ink droplets are to be ejected, it is not necessary to form dots to a high density, in comparison with the ink. Consequently, the treatment liquid ejection head 11 may also be composed with a reduced number of nozzles (a reduced nozzle density) in comparison with the print head 50 for ejecting ink. Furthermore, a composition may also be adopted in which the nozzle diameter of the treatment liquid ejection head 11 is greater than the nozzle diameter of the print head 50 for ejecting ink.

Composition of Ink Supply System

Figure 6:
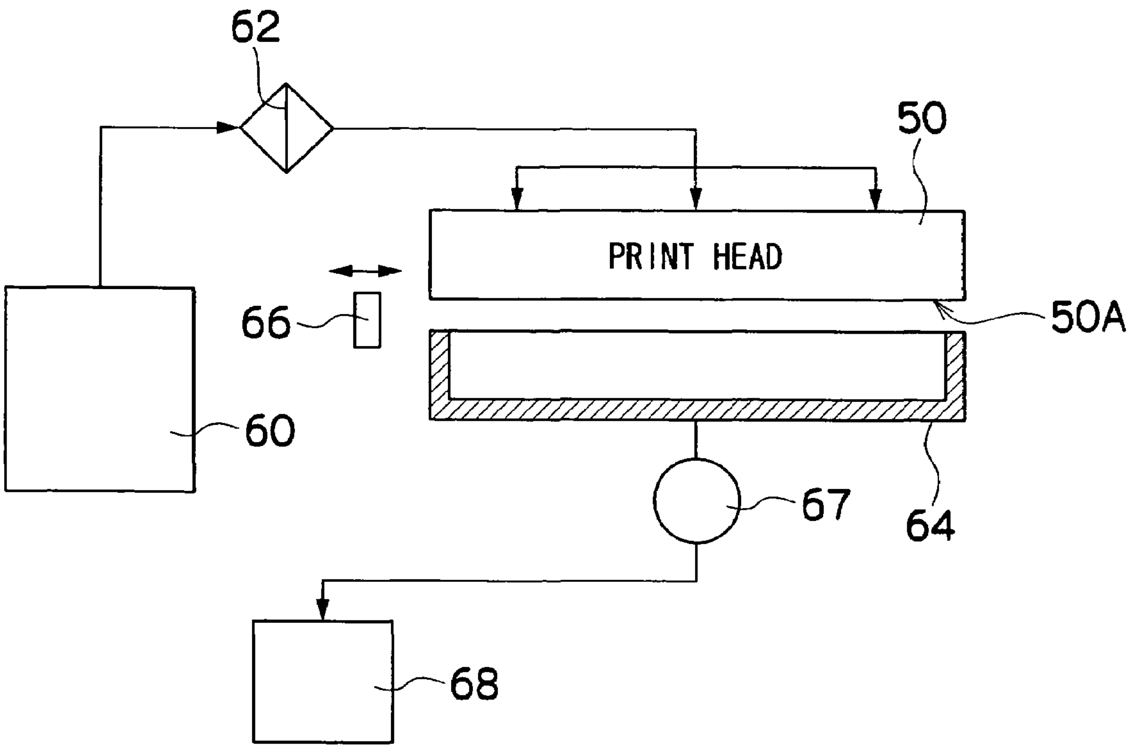
FIG. 6 is a schematic drawing showing the composition of an ink supply system in the inkjet recording apparatus.

FIG. 6 is a conceptual diagram showing the composition of an ink supply system in the inkjet recording apparatus 10. In FIG. 6, the ink tank 60 is a base tank for supplying ink to the print head 50, which is disposed in the ink storing and loading unit 14 shown in FIG. 1. In other words, the ink supply tank 60 in FIG. 6 is equivalent to the ink storing and loading unit 14 in FIG. 1. The ink tank 60 may adopt a system for replenishing ink by means of a replenishing port (not shown), or a cartridge system in which cartridges are exchanged independently for each tank, whenever the residual amount of ink has become low. If the type of ink is changed in accordance with the type of application, then a cartridge-based system is suitable. In this case, desirably, type information relating to the ink is identified by means of a bar code, or the like, and the ejection of the ink is controlled in accordance with the ink type.

A filter 62 for removing foreign matters and bubbles is disposed between the ink tank 60 and the head 50 as shown in FIG. 6. The filter mesh size in the filter 62 is preferably equivalent to or less than the diameter of the nozzle. Although not shown in FIG. 6, it is preferable to provide a sub-tank integrally to the print head 50 or nearby the head 50. The sub-tank has a damper function for preventing variation in the internal pressure of the head and a function for improving refilling of the print head.

The inkjet recording apparatus 10 is also provided with a cap 64 as a device to prevent the nozzles 51 from drying out or to prevent an increase in the ink viscosity in the vicinity of the nozzles 51, and a cleaning blade 66 as a device to clean the nozzle face 50A. A maintenance unit (a restoring device) including the cap 64 and the cleaning blade 66 can be relatively moved with respect to the head 50 by a movement mechanism (not shown), and is moved from a predetermined holding position to a maintenance position below the head 50 as required.

The cap 64 is displaced up and down relatively with respect to the head 50 by an elevator mechanism (not shown). When the power of the inkjet recording apparatus 10 is turned OFF or when in a print standby state, the cap 64 is raised to a predetermined elevated position so as to come into close contact with the head 50, and the nozzle face 50A is thereby covered with the cap 64.

The cleaning blade 66 is composed of rubber or another elastic member, and can slide on the nozzle surface 50A (nozzle plate surface) of the print head 50 by means of a blade movement mechanism (not shown). If there are ink droplets or foreign matter adhering to the nozzle plate surface, then the nozzle plate surface is wiped clean by causing the cleaning blade 66 to slide over the nozzle plate.

During printing or standby, when the frequency of use of specific nozzles is reduced and ink viscosity increases in the vicinity of the nozzles, a preliminary discharge is made to eject the degraded ink toward the cap 64 (also used as an ink receiver).

When a state in which ink is not ejected from the head 50 continues for a certain amount of time or longer, the ink solvent in the vicinity of the nozzles 51 evaporates and ink viscosity increases. In such a state, ink can no longer be ejected from the nozzle 51 even if the actuator 58 for the ejection driving is operated. Before reaching such a state (in a viscosity range that allows ejection by the operation of the actuator 58) the actuator 58 is operated to perform the preliminary discharge to eject the ink of which viscosity has increased in the vicinity of the nozzle toward the ink receptor. After the nozzle surface is cleaned by a wiper such as the cleaning blade 66 provided as the cleaning device for the nozzle face 50A, a preliminary discharge is also carried out in order to prevent the foreign matter from becoming mixed inside the nozzles 51 by the wiper sliding operation. The preliminary discharge is also referred to as "dummy discharge", "purge", "liquid discharge", and so on.

On the other hand, if air bubbles become intermixed into the nozzle 51 or pressure chamber 52, or if the rise in the viscosity of the ink inside the nozzle 51 exceeds a certain level, then it may not be possible to eject ink in the preliminary ejection operation described above. In cases of this kind, a cap 64 forming a suction device is pressed against the nozzle surface 50A of the print head 50, and the ink inside the pressure chambers 52 (namely, the ink containing air bubbles of the ink of increased viscosity) is suctioned by a suction pump 67. The ink suctioned and removed by means of this suction operation is sent to a collection tank 68. The ink collected in the collection tank 68 may be used, or if reuse is not possible, it may be discarded.

Since the suctioning operation is performed with respect to all of the ink in the pressure chambers 52, it consumes a large amount of ink, and therefore, desirably, preliminary ejection is carried out while the increase in the viscosity of the ink is still minor. The suction operation is also carried out when ink is loaded into the print head 50 for the first time, and when the head starts to be used after being idle for a long period of time.

The supply system for the treatment liquids is not illustrated, but it is substantially the same as the composition of the ink supply system shown in FIG. 6. In the present embodiment, as described in FIG. 1, two types of treatment liquids A and B are supplied respectively from the treatment liquid tanks 15A and 15B to the treatment liquid ejection head 11.

Description of Control System

Figure 7:
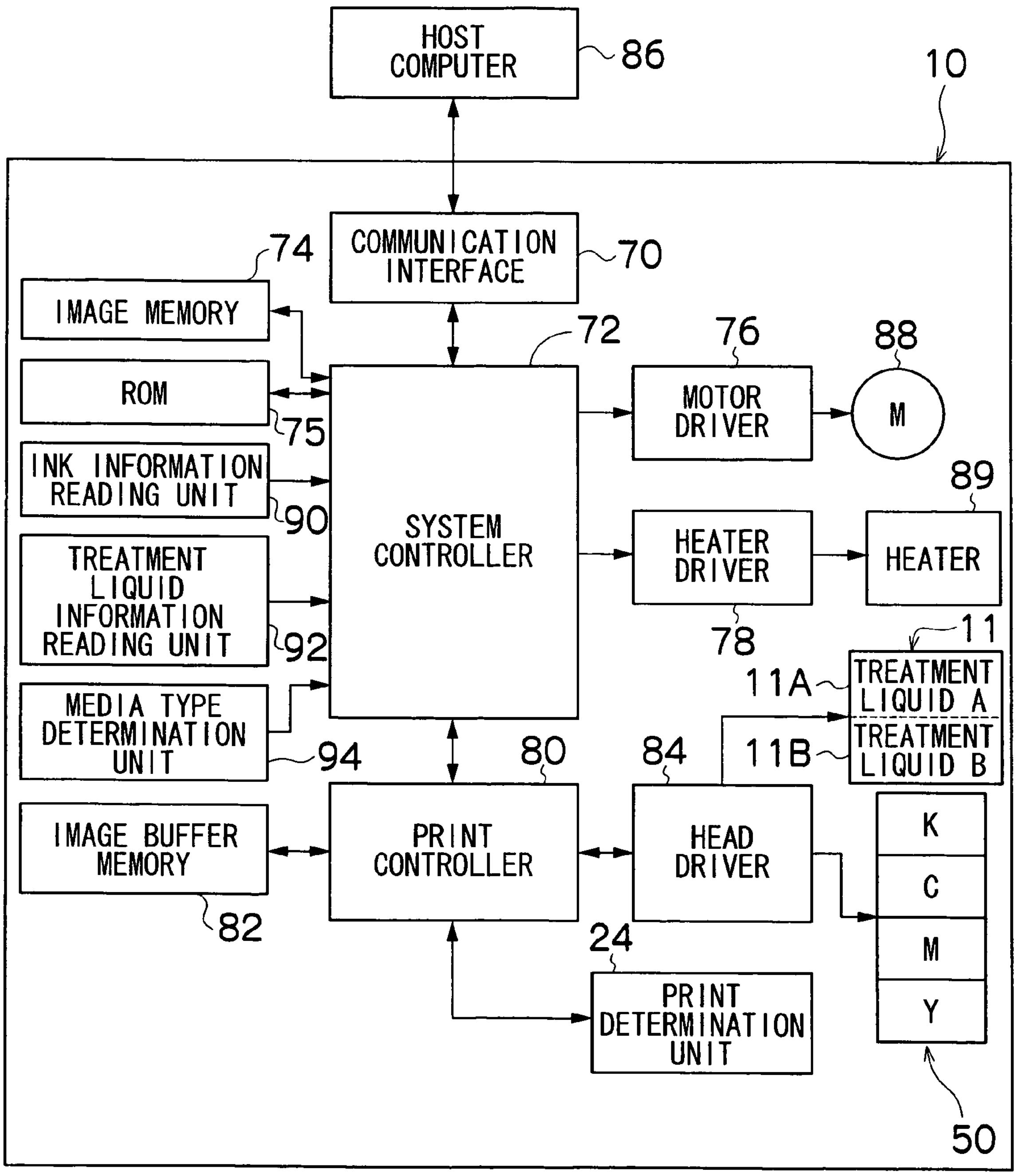
FIG. 7 is a principal block diagram showing the system composition of the inkjet recording apparatus.

FIG. 7 is a principal block diagram showing the system configuration of the inkjet recording apparatus 10. The inkjet recording apparatus 10 comprises a communication interface 70, a system controller 72, an image memory 74, a ROM 75, a motor driver 76, a heater driver 78, a print controller 80, an image buffer memory 82, a head driver 84, and the like.

The communication interface 70 is an interface unit for receiving image data sent from a host computer 86. A serial interface such as USB, IEEE1394, Ethernet, wireless network, or a parallel interface such as a Centronics interface may be used as the communication interface 70. A buffer memory (not shown) may be mounted in this portion in order to increase the communication speed.

The image data sent from the host computer 86 is received by the inkjet recording apparatus 10 through the communication interface 70, and is temporarily stored in the image memory 74. The image memory 74 is a storage device for temporarily storing images inputted through the communication interface 70, and data is written and read to and from the image memory 74 through the system controller 72. The image memory 74 is not limited to a memory composed of semiconductor elements, and a hard disk drive or another magnetic medium may be used.

The system controller 72 is constituted by a central processing unit (CPU) and peripheral circuits thereof, and the like, and it functions as a control device for controlling the whole of the inkjet recording apparatus 10 in accordance with a prescribed program, as well as a calculation device for performing various calculations. More specifically, the system controller 72 controls the various sections, such as the communication interface 70, image memory 74, motor driver 76, heater driver 78, and the like, as well as controlling communications with the host computer 86 and writing and reading to and from the image memory 74, and it also generates control signals for controlling the motor 88 and heater 89 of the conveyance system.

The program executed by the CPU of the system controller 72 and the various types of data which are required for control procedures are stored in the ROM 75. The ROM 75 may be a non-writeable storage device, or it may be a rewriteable storage device, such as an EEPROM. The image memory 74 is used as a temporary storage region for the image data, and it is also used as a program development region and a calculation work region for the CPU.

The motor driver (drive circuit) 76 drives the motor 88 in accordance with commands from the system controller 72. The heater driver (drive circuit) 78 drives the heater 89 of the post-drying unit 42 or the like in accordance with commands from the system controller 72.

The print controller 80 is a control unit having a signal processing function for performing various treatment processes, corrections, and the like, in accordance with the control implemented by the system controller 72, in order to generate a signal for controlling printing from the image data in the image memory 74. The print controller 80 supplies the print data (dot data) thus generated to the head driver 84. Prescribed signal processing is carried out in the print controller 80, and the ejection range of the treatment liquid, and the ejection amount and the ejection timing of the ink droplets are controlled via the head driver 84, on the basis of the print data. By this means, prescribed dot size and dot positions can be achieved.

The print controller 80 is provided with the image buffer memory 82; and image data, parameters, and other data are temporarily stored in the image buffer memory 82 when image data is processed in the print controller 80. The aspect shown in FIG. 7 is one in which the image buffer memory 82 accompanies the print controller 80; however, the image memory 74 may also serve as the image buffer memory 82. Also possible is an aspect in which the print controller 80 and the system controller 72 are integrated to form a single processor.

The head driver 84 drives the actuators 58 in the respective color heads 50, on the basis of the print data supplied from the print controller 80, and it also drives the actuators of the treatment liquid ejection head 11. A feedback control system for maintaining constant drive conditions for the print heads may be included in the head driver 84.

The image data to be printed is externally inputted through the communication interface 70, and is stored in the image memory 74. In this stage, the RGB image data is stored in the image memory 74.

The image data stored in the image memory 74 is sent to the print controller 80 through the system controller 72, and is converted to the dot data for each ink color by a half-toning technique, such as dithering or error diffusion, in the print controller 80. In this inkjet recording apparatus 10, an image which appears to have a continuous tonal gradation to the human eye is formed by changing the droplet ejection density and the dot size of fine dots created by ink (coloring material), and therefore, it is necessary to convert the input digital image into a dot pattern which reproduces the tonal gradations of the image (namely, the light and shade toning of the image) as faithfully as possible.

In other words, the print controller 80 performs processing for converting the input RGB image data into dot data for the four colors of K, C, M and Y Furthermore, the print controller 80 judges the deposition region of the treatment liquid (the region of the recording surface where deposition of the treatment liquid is required) on the basis of the dot data of the respective colors, and thus generates dot data for the deposition of treatment liquid droplets. The dot data (for the treatment liquid and the respective colors) generated by the print controller 80 is stored in the image buffer memory 82.

The head driver 84 generates drive control signals for the treatment liquid ejection head 11 and the print heads 50 of the respective ink colors, on the basis of the dot data stored in the image buffer memory 82. By supplying the drive control signals generated by the head driver 84 to the treatment liquid ejection head 11 and the print heads 50 of respective ink colors, treatment liquid is ejected from the treatment liquid ejection head 11 and inks are ejected from the print heads 50. By controlling the ejection of treatment liquid from the treatment liquid ejection head 11 and the ejection of ink from the print head 50 in synchronism with the conveyance speed of the recording medium 16, an image is formed on the recording medium 16.

As shown in FIG. 1, the print determination unit 24 is a block including a line sensor, which reads in the image printed onto the recording medium 16, performs various signal processing operations, and the like, and determines the print situation (presence/absence of discharge, variation in droplet ejection, optical density, and the like), these determination results being supplied to the print controller 80.

According to requirements, the print controller 80 makes various corrections with respect to the head 50 on the basis of information obtained from the print determination unit 24. Furthermore, the system controller 72 implements control for carrying out preliminary ejection, suctioning, and other prescribed restoring processes on the head 50, on the basis of the information obtained from the print determination unit 24.

The inkjet recording apparatus 10 according to this embodiment also has an ink information reading unit 90, a treatment liquid information reading unit 92 and a media type determination unit 94. The ink information reading unit 90 is a device for reading in information relating to the ink type. More specifically, it is possible to use, for example, a device which reads in ink identification information or ink properties information from the shape of the cartridge in the ink tank 60 (see FIG. 6) (a specific shape which allows the ink type to be identified), or from a bar code or IC chip incorporated into the cartridge. Besides this, it is also possible for an operator to input the required information by means of a user interface.

Similarly, the treatment liquid information reading unit 92 is a device for acquiring information relating to the type of treatment liquid. More specifically, it is possible to use, for example, a device which reads in treatment liquid identification information or properties information from the shape of the cartridge in the treatment liquid tanks 15A and 15B (see FIG. 1) (a specific shape which allows the liquid type to be identified), or from a bar code or IC chip incorporated into the cartridge. Besides this, it is also possible for an operator to input the required information by means of a user interface.

The media type determination unit 94 is a device for determining the type and size of the recording medium. This section uses, for example, a device for reading in information (identification information or media type information) from a bar code attached to the magazine in the media supply unit 18, or sensors disposed at a suitable position in the paper conveyance path (a media width determination sensor, a sensor for determining the thickness of the media, a sensor for determining the reflectivity of the media, and so on). A suitable combination of these elements may also be used. Furthermore, it is also possible to adopt a composition in which information relating to the paper type, size, or the like, is specified by means of an input via a prescribed user interface, instead of or in conjunction with such automatic determining devices.

The information acquired from the various devices, namely, the ink information reading unit 90, the treatment liquid information reading unit 92 and the media type determination unit 94 is sent to the system controller 72, where it is used to select the treatment liquid and to control ejection of the ink (namely, the ejection volume and ejection timing), in such a manner that suitable droplet ejection is performed in accordance with the conditions. More specifically, the system controller 72 judges the permeation speed characteristics of the recording medium 16 on the basis of the information obtained from the respective devices of the ink information reading unit 90, the treatment liquid reading unit 92 and the media type determination unit 94, and it decides whether or not to use a treatment liquid, and if a treatment liquid is to be used, it selects the type of treatment liquid and controls the volume to be ejected.

As described in FIG. 1, in the inkjet recording apparatus 10 according to the present embodiment, a composition is adopted in which a treatment liquid ejection head 11 is disposed in the most upstream position of the print unit 12, and before depositing droplets of ink from the print unit 12, treatment liquid is previously applied to the print surface of the recording medium 16 by means of a single operation by the preceding treatment liquid ejection head 11. In the case of this composition, the amount of treatment liquid on the recording medium 16 gradually declines as the volume of the ink droplets deposited by the print unit 12 increases, and therefore, the further the position toward the downstream side of the print unit 12, the smaller the amount of treatment liquid on the recording medium 16. Since it is necessary for some treatment liquid to be remaining in the vicinity of the surface of the recording medium 16 until droplet deposition by the head in the final stage (furthest downstream position) of the print unit 12 (in FIG. 1, the yellow head 12Y) has been completed, then the amount of treatment liquid ejected by the treatment liquid ejection head 11 is decided on the basis of the type of recording medium 16, the properties of the treatment liquid, the ejected ink volume, the conveyance speed of the recording medium 16, and the like, in such a manner that the presence of the required amount of treatment liquid can be ensured.

The inkjet recording apparatus 10 comprises an information storage device which stores data for a media type table that associates the media type with the permeation speed characteristics (for example, the ROM 75 shown in FIG. 7, or an internal memory or external memory (not shown)), and the system controller 72 judges the permeation speed characteristics of the recording medium 16 used by referring to this media type table.

If, for example, a permeable paper having a fast permeation speed is used, then a treatment liquid having a higher surface tension is selected in comparison with a case where a permeable paper having a low permeation speed (or a non-permeable paper) is used. In the present embodiment, if the surface tension of the treatment liquid A is greater than the surface tension of the treatment liquid B, then when using a permeable paper having a fast permeation speed, the actuators in the treatment liquid ejection head 11 corresponding to the nozzle row 11A which ejects treatment liquid A are driven, so that the treatment liquid A is ejected from the treatment liquid ejection head 11. On the other hand, if permeable paper having a slow permeation speed, or non-permeable paper, is used, then the actuators of the treatment liquid ejection head 11 corresponding to the nozzle row 11B which ejects treatment liquid B are driven, so that the treatment liquid B is ejected from the treatment liquid ejection head 11.

According to the above, even in the case of a permeable paper of fast permeation speed, it is possible to reduce the permeation speed of the treatment liquid A by using a treatment liquid A which has a large surface tension.

Alternatively, when using a permeable paper having a fast permeation speed, there is also a control mode in which no treatment liquid is used (droplets of treatment liquid are not ejected and an image is formed by means of ink only).

Here, a "permeable paper having a fast permeation speed" means a permeable paper in which the time required for a first liquid (treatment liquid) to permeate completely into the paper is shorter than the time difference between the droplet deposition times of the first liquid (treatment liquid) and the second liquid (ink). If a medium having high permeability is used, in such a manner that the presence of a prescribed quantity of treatment liquid cannot be guaranteed on the recording surface when ink droplets are deposited, then there is little sense in using treatment liquid and conversely, any treatment liquid may even exacerbate bleeding of the ink. Therefore, in such cases, it is preferable not to use treatment liquid.

In other words, in the case of permeable paper, there is less bleeding of the ink when only ink droplets are ejected, compared to a case where ink droplets are deposited onto treatment liquid. This is because the higher the surface tension, the lower the extent of bleeding, and when ink droplets are deposited onto treatment liquid, the ink tends to bleed as a result of bleeding of the treatment liquid. Consequently, it is possible to suppress bleeding by selecting the surface tension of the treatment liquid, or by selecting whether or not to use treatment liquid, depending on whether or not a permeable paper or a non-permeable paper is used, and thus performing droplet ejection in accordance with the characteristics of the recording medium.

As a device for ascertaining the permeation speed characteristics of the recording medium 16, it is possible to obtain the ID (identification information) of the media from the media type determination unit 94, and then ascertain the permeation speed characteristics of the media by referring to a media type table, or alternatively, it is possible to record information indicating the permeation speed characteristics of the media on an information recording body, such as a barcode attached to a magazine, and to then read in the information relating to the permeation speed characteristics of the media directly from the media type determination unit 94.

Alternatively, it is also possible to use a device which actually measures the permeation speed of the recording medium 16. For example, ink, or treatment liquid, or both ink and treatment liquid are deposited onto the recording medium 16, the state of the dots formed by this test droplet deposition is read in by a determination device, such as an imaging element, (this determination device may be substituted by the print determination unit 24), and the permeation speed can be calculated on the basis of the information thus obtained.

Physical Conditions of Treatment Liquid and Ink

The desirable physical conditions of the treatment liquid and ink are described below.

The surface tension $\alpha 1$ of the treatment liquid is preferably 35 mN/m or below. In particular, if the treatment liquid is ejected by an inkjet type treatment liquid ejection head 11, then desirably, 20 (mN/m)$\leqq\alpha 1\leqq$35 (mN/m). On the other hand, if a device which applies treatment liquid by placing a member, such as a roller, in contact with the recording medium 16 is used instead of a treatment liquid ejection head 11, then desirably, 10 (mN/m)$\leqq\alpha 1\leqq$35 (mN/m).

If these conditions are satisfied, then the surface tension of the treatment liquid is relatively low, and therefore the height of the liquid on the print surface of the recording medium 16 is restricted and the treatment liquid can be applied in a substantially even manner without any nonuniformities.

On the other hand, with respect to the ink, it is desirable to use an ink having a surface tension $\alpha 2$ which is 10 mN/m or more greater than the surface tension al of the treatment liquid, in other words, an ink whereby the difference ($\alpha 2-\alpha 1$) between the surface tension of the ink $\alpha 2$ and the surface tension of the treatment liquid $\alpha 1$ is 10 mN/m or above (namely, $\alpha 2$-$\alpha 1\leqq$10 (mN/m)), and desirably, the angle of contact of the ink $\beta 21$ on the treatment liquid is 35 degrees or less. The upper limit of the surface tension $\alpha 2$ of the ink is approximately 50 mN/m.

The action in a case where a combination of treatment liquid and ink satisfying the aforementioned conditions is now described with reference to FIGS. 8A to 8D and FIGS. 9A to 9C.

Figure 8A:
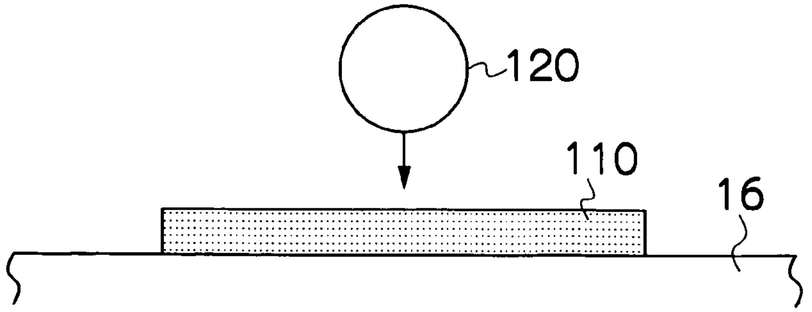
FIGS. 8A to 8D are schematic drawings showing a situation where one droplet of ink is deposited onto treatment liquid coating the recording medium.
Figure 8B:
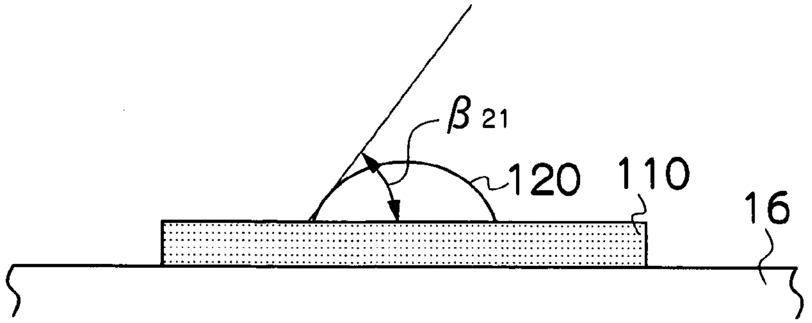

FIGS. 8A to 8D are schematic drawings showing a state where one droplet of ink 120 is deposited onto treatment liquid 110 coating the recording medium 16. As shown in FIG. 8A, treatment liquid 110 is previously applied to the recording medium 16, and when ink 120 is ejected in a state where the treatment liquid 110 is present on the recording medium 16, then as shown in FIG. 8B, the ink 120 lands on the treatment liquid 110. The angle of contact (initial angle of contact) of the ink 120 thus deposited with respect to the treatment liquid 110, $\beta 21$, is 35 degrees or less.

Figure 8C:
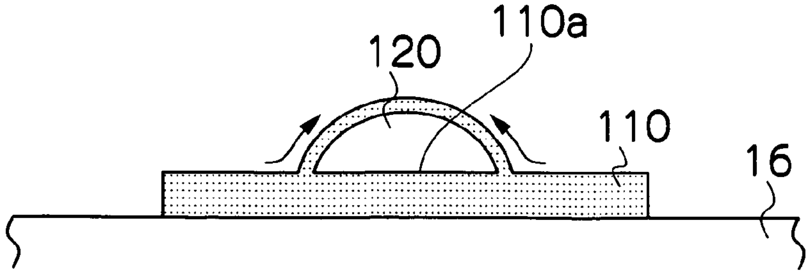

When the ink 120 is deposited on the treatment liquid 110, due to the surface tension of both liquids, as shown in FIG. 8C, the treatment liquid 110 moves so as to cover the surface of the droplet of ink 120, and the boundary of the ink 120 is enclosed by the treatment liquid 110. In this way, the ink 120 covered by the treatment liquid 110 hardens due to a reaction of the two liquids in at least the surface (boundary) section of the ink 120 contacting the treatment liquid 110, and as shown in FIG. 8D, a thin film 122 is formed on the surface of the deposited droplet of the ink 120.

Figure 8D:
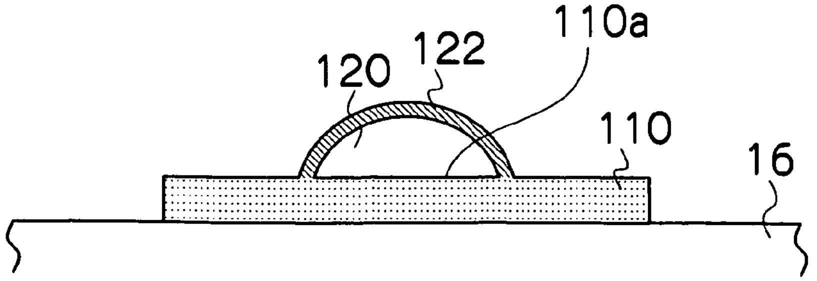

Thereupon, as time passes, treatment liquid is supplied into the ink 120 from the treatment liquid 110*a* present on the underside of the ink 120 shown in FIGS. 8C and 8D, and a chemical reaction between the treatment liquid 110 and the ink 120 proceeds, the hardening (curing) reaction progresses to the interior of the droplet of ink 120, and the ink eventually becomes fixed.

Here, in addition to a mode where the ink coloring material becomes fixed by permeating into the recording medium, "fixing" may also include a mode where the ink solvent evaporates or permeates into the recording medium, and the coloring material becomes fixed while remaining on the recording medium, or where it solidifies (hardens) on the recording medium.

Figure 9A:
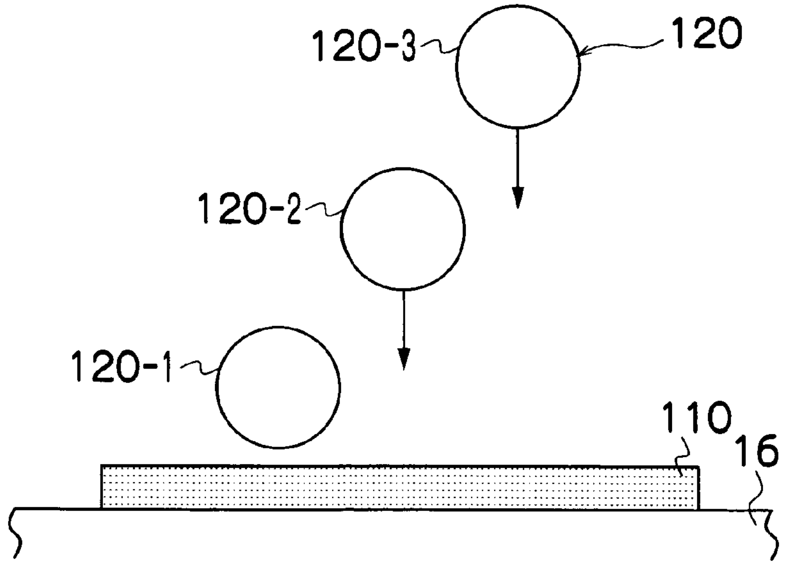
FIGS. 9A to 9C are schematic drawings showing a situation where a plurality of droplets of ink are deposited consecutively onto treatment liquid coating the recording medium.
Figure 9B:
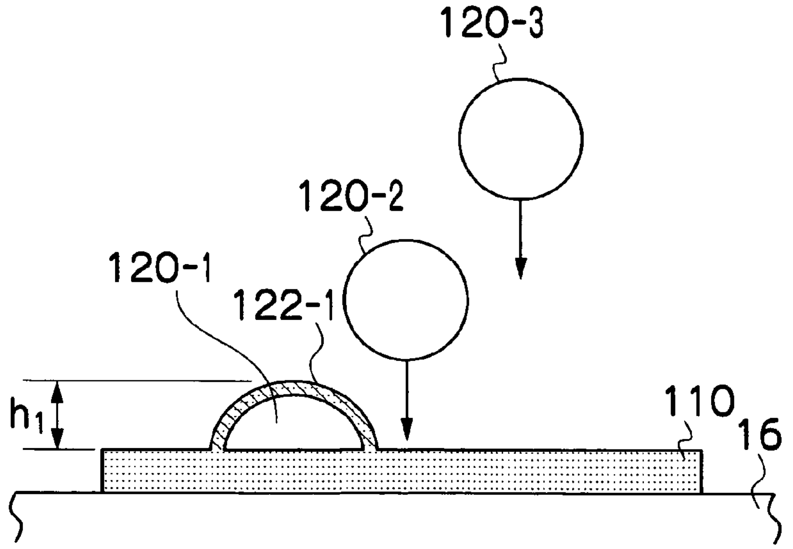
Figure 9C:
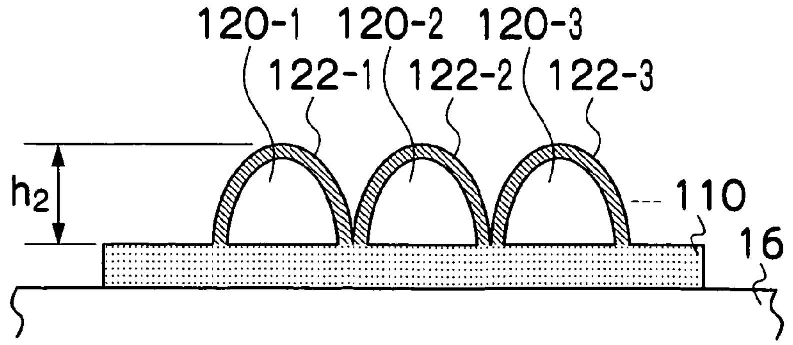

FIGS. 9A to 9C are schematic drawings showing a state where a plurality of droplets of ink 120 (in this case, 3 droplets) are deposited onto treatment liquid 110 coating the recording medium 16. In FIG. 9A, the droplets are denoted with the reference numerals 120-1, 120-2 and 120-3, from the left-hand side, in accordance with the ejection sequence. The plurality of liquid droplets 120-1 to 120-3 are ejected consecutively at a short time period, separated by certain time intervals, and the distance between the liquid droplets and the volume of the liquid droplets are controlled in such a manner that, when deposited on the recording medium 16, the mutually adjacent liquid droplets thus deposited overlap at least partially, or make contact with each other.

As shown in FIG. 9B, when the first liquid droplet 120-1 is deposited, then as shown in FIGS. 8C and 8D, the treatment liquid 110 covers the perimeter of the liquid droplet 120-1, thus forming a film 122-1 on the surface of the liquid droplet 120-1. Subsequently, when a second liquid droplet 120-2 is deposited, it collides with the first liquid droplet 120-1, but since the hardened film 122-1 has been formed on the surface of the first liquid droplet 120-1, then deposition interference between the liquid droplets is prevented by the film 122-1. The degree of hardening of the film 122-1 also includes a semi-hardened or semi-solidified state, provided that the film is hardened sufficiently to prevent mixing due to deposition interference between liquid droplets deposited at mutually adjacent positions.

As a result of preventing deposition interference due to the action of the film 122-1, the second liquid droplet 120-2 adheres to the treatment liquid 110 without mixing with the first liquid droplet 120-1. Although the hardened film 122-1 is formed on the surface of the first liquid droplet 120-1, the droplet as a whole retains fluid characteristics and when the second liquid droplet 120-2 is deposited, the second liquid droplet 120-2 and the first liquid droplet 120-1 exert a force on each other (the liquid droplets push against each other), and they change respectively to the form of stable liquid droplets. In other words, as shown in FIG. 9C, the adjacent liquid droplets push against each other and are displaced to stable positions, in such a manner that the liquid droplets change from an initial height of h1 as shown in FIG. 9B to a raised form (a shape in which the liquid droplet height h2 is greater than h1 ). The angle of contact of the liquid droplet 120-1 in the state in FIG. 9C is greater than the initial angle of contact β21 (see FIG. 8B), due to the action of the adjacent ink droplets.

Furthermore, as shown in FIG. 9C, in the case of the second liquid droplet 120-2 which makes contact with the treatment liquid 110 on the recording medium 16, similarly to the first droplet 120-1, the treatment liquid 110 covers the whole perimeter of the liquid droplet 120-2 and forms a film 122-2 on the surface of the liquid droplet 120-2. In the droplet deposition of the third liquid droplet 120-3, and the subsequent droplet depositions of the fourth droplet, the fifth droplet, and so on, which are not shown in the drawing, a similar effect occurs and hence deposition interference between mutually adjacent liquid droplets is prevented. In this way, the liquid droplets 120-1, 120-2 and 120-3 respectively remain in an isolated state on the recording medium 16, without the mutually adjacent liquid droplets mixing together, and hence an independent dot is formed by each droplet (see FIG. 9C).

As shown in FIG. 8B, by selecting the type of treatment liquid and the type of ink in such a manner that the angle of contact β21 of the ink 120 when a droplet of ink 120 is ejected on top of the treatment liquid 110 is 35 degrees or less, then the fixing force of the ink 120 on the treatment liquid 110 (in other words, the recording medium 16) (namely, the force causing the ink to remain at its landing position) is increased, and the displacement of the deposition position after landing is restricted.

Furthermore, by setting the difference (α2−α1) between the surface tension α2 of the ink 120 and the surface tension α1 of the treatment liquid 110 to a large difference of 10 mN/m or greater, then the treatment liquid 110 becomes more readily able to surround the ink 120 after it has been deposited, and hence the film 122 is formed more readily.

Specific Examples of Treatment Liquid and Ink

In the present embodiment, it is possible to use, as the treatment liquid, an aqueous solution, for example, containing at least the following substances:

| | |
|---|---|
| Sharol DC-902P, manufactured by Dai-Ichi Kogyo Seiyaku Co., Ltd.: | 1 to 20 wt %; and |
| Olfine E1010, manufactured by Nissin Chemical Industry Co., Ltd. (as a surface-active agent): | 0.1 to 10 wt %. |

The following substances can be added to this aqueous solution:

| | |
|---|---|
| glycerol (as a high-boiling-point solvent): | 0 to 30 wt %; and |
| triethanolamine (as a pH adjuster): | 0 to 10 wt %. |

Figure 10A:
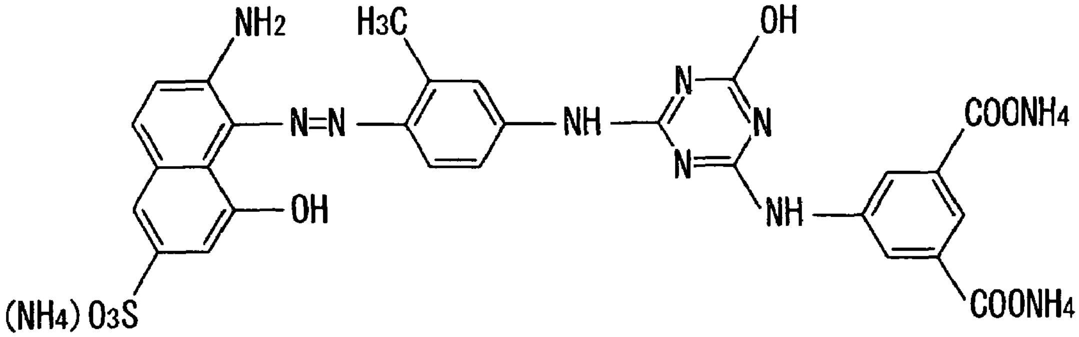
FIGS. 10A to 10C are structural formulas of examples of anionic dye compounds used in the inkjet recording apparatus.
Figure 10B:
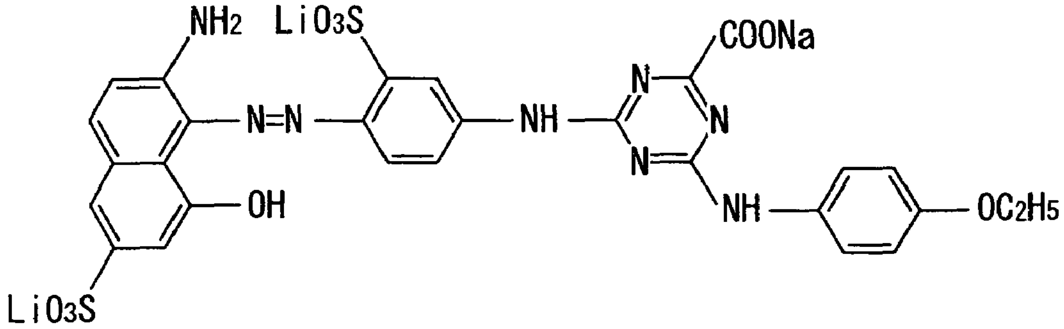
Figure 10C:
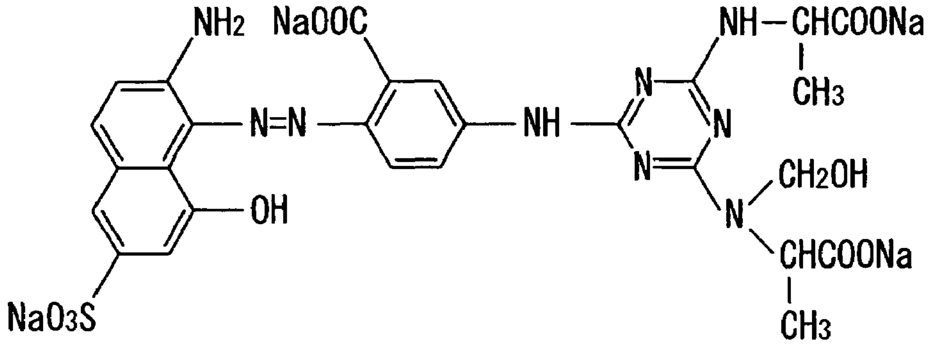

On the other hand, it is possible to use, as an ink containing a coloring material, an aqueous solution, for example, containing at least the following substances:

| | |
|---|---|
| an anionic dye compound having the structure shown in FIG. 10A, 10B or 10C, for example: | 1 to 30 wt %; and |
| Olfine E1010, manufactured by Nissin Chemical Industry Co., Ltd. (as a surface-active agent): | 0.1 to 10 wt %. |

The following substances can be added to this aqueous solution:

| | |
|---|---|
| polystyrene sodium sulfonate | 0 to 20 wt %; |
| glycerol (as a high-boiling-point solvent): | 0 to 30 wt %; and |
| triethanolamine (as a pH adjuster): | 0 to 10 wt %. |

FURTHER EMBODIMENT

In the embodiment described above, one treatment liquid ejection head 11 is disposed upstream of the print unit 12 (see FIG. 1); however, in implementing the present invention, the arrangement of the treatment liquid ejection head is not limited to this embodiment, and it is also possible to adopt a composition in which a treatment liquid ejection head is appended in at least one position between the color ink heads in the print unit 12.

Furthermore, in the present embodiment described above, an ejection head based on an inkjet method is used as the device for applying treatment liquid; however, instead of or in combination with this, it is also possible to use a device which applies treatment liquid to the recording medium 16 by using an application member, such as a roller, brush, blade, or the like.

In the above-described embodiments, the inkjet recording apparatus uses a page-wide full line type head having a nozzle row of a length corresponding to the entire width of the recording medium; however, the scope of application of the present invention is not limited to this, and the present invention may also be applied to an inkjet recording apparatus using a shuttle head which performs image recording while moving a short recording head reciprocally.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming apparatus, comprising:

a first liquid application device which applies a first liquid to a recording medium; and an ejection head which ejects a second liquid onto the first liquid having been applied to the recording medium by the first liquid application device, wherein:

a surface tension $\alpha\mathbf{1}$ of the first liquid is 35 mN/m or lower;

a difference ($\alpha\mathbf{2}-\alpha\mathbf{1}$) between a surface tension $\alpha\mathbf{2}$ of the second liquid and the surface tension $\alpha\mathbf{1}$ of the first liquid is 10 mN/m or greater;

an angle of contact of the second liquid on the first liquid is 35 degrees or less;

the second liquid is an ink containing a coloring material; and the first liquid is a treatment liquid having a reactivity which causes at least a surface portion of a deposited droplet of the second liquid to harden.

2. The image forming apparatus as defined in claim 1, further comprising:

a medium information acquiring device which acquires information relating to permeation speed characteristics of the recording medium; and a first liquid application control device which controls a process of applying the first liquid by the first liquid application device, according to the information obtained by the medium information acquiring device.

3. The image forming apparatus as defined in claim 2, wherein:

a plurality of types of liquid are prepared as the first liquid; and the first liquid application control device performs control to select one of the plurality of types of liquid to be applied to the recording medium, according to the information obtained by the medium information acquiring device.

4. The image forming apparatus as defined in claim 2, wherein the first liquid application control device performs control to switch between implementation and non-implementation of the process of applying the first liquid onto the recording medium, according to the information obtained by the medium information acquiring device.

5. An image forming method, comprising:

a first liquid application step of applying a first liquid to a recording medium; and a second liquid ejection step of ejecting a second liquid from an ejection head, according to image data for printing, onto the first liquid having been applied to the recording medium in the first liquid application step, wherein:

a surface tension $\alpha\mathbf{1}$ of the first liquid is 35 mN/m or lower;

a difference ($\alpha\mathbf{2}-\alpha\mathbf{1}$) between a surface tension $\alpha\mathbf{2}$ of the second liquid and the surface tension $\alpha\mathbf{1}$ of the first liquid is 10 mN/m or greater;

an angle of contact of the second liquid on the first liquid is 35 degrees or less;

the second liquid is an ink containing a coloring material; and the first liquid is a treatment liquid having a reactivity which causes at least a surface portion of a deposited droplet of the second liquid to harden.

6. An image forming apparatus, comprising:

a first liquid application device which applies a first liquid to a recording medium, a plurality of types of liquid being prepared as the first liquid;

an ejection head which ejects a second liquid onto the first liquid having been applied to the recording medium by the first liquid application device;

a medium information acquiring device which acquires information relating to permeation speed characteristics of the recording medium; and a first liquid application control device which controls a process of applying the first liquid by the first liquid application device according to the information obtained by the medium information acquiring device by:

adjusting the volume of the first liquid to be applied to the recording medium, according to the information obtained by the medium information acquiring device, selecting one of the plurality of types of liquid as the first liquid to be applied to the recording medium, according to the information obtained by the medium information acquiring device, and switching between implementation and non-implementation of the process of applying the first liquid onto the recording medium, according to the information obtained by the medium information acquiring device, wherein:

a surface tension $\alpha\mathbf{1}$ of the first liquid is 35 mN/m or lower;

a difference ($\alpha\mathbf{2}-\alpha\mathbf{1}$) between a surface tension $\alpha\mathbf{2}$ of the second liquid and the surface tension $\alpha\mathbf{1}$ of the first liquid is 10 mN/m or greater; and an angle of contact of the second liquid on the first liquid is 35 degrees or less.

7. The image forming apparatus as defined in claim 1, wherein:

at least a prescribed quantity of the first liquid forms a liquid layer on the recording medium when the ejection head ejects the second liquid, and the second liquid is deposited onto the liquid layer of the first liquid; and the angle of contact of the second liquid on the liquid layer of the first liquid is 35 degrees or less.

8. The image forming apparatus as defined in claim 1, wherein the second liquid reacts with the first liquid on the recording medium so that a film is formed on a surface of each of droplets of the second liquid and the droplets of the second liquid are thereby isolated from each other.

9. The image forming apparatus as defined in claim 1, wherein:

the first liquid includes a cationic polymer containing positively charged surface-active ions; and the second liquid includes an anionic polymer containing negatively charged surface-active ions.

10. An image forming method, comprising:

a first liquid application step of applying a first liquid to a recording medium, a plurality of types of liquid being prepared as the first liquid;

a second liquid ejection step of ejecting a second liquid from an ejection head, according to image data for printing, onto the first liquid having been applied to the recording medium in the first liquid application step;

acquiring information relating to permeation speed characteristics of the recording medium; and controlling a process of applying the first liquid according to the information obtained by the step of acquiring by:

adjusting the volume of the first liquid to be applied to the recording medium, according to the information obtained by the step of acquiring, selecting one of the plurality of types of liquid as the first liquid to be applied to the recording medium, according to the information obtained by the step of acquiring, and switching between implementation and non-implementation of the process of applying the first liquid onto the recording medium, according to the information obtained by the step of acquiring, wherein:

a surface tension $\alpha\mathbf{1}$ of the first liquid is 35 mN/m or lower;

a difference ($\alpha\mathbf{2}-\alpha\mathbf{1}$) between a surface tension $\alpha\mathbf{2}$ of the second liquid and the surface tension $\alpha\mathbf{1}$ of the first liquid is 10 mN/m or greater; and an angle of contact of the second liquid on the first liquid is 35 degrees or less.

11. The image forming method as defined in claim 5, wherein:

in the second liquid ejection step, at least a prescribed quantity of the first liquid forms a liquid layer on the recording medium when the second liquid is ejected from the ejection head, and the second liquid is deposited onto the liquid layer of the first liquid; and the angle of contact of the second liquid on the liquid layer of the first liquid is 35 degrees or less.

12. The image forming method as defined in claim 5, wherein the second liquid reacts with the first liquid on the recording medium so that a film is formed on a surface of each of droplets of the second liquid and the droplets of the second liquid are thereby isolated from each other.

13. The image forming method as defined in claim 5, wherein the first liquid includes a cationic polymer containing positively charged surface-active ions; and the second liquid includes an anionic polymer containing negatively charged surface-active ions.

* * * * *